(12) United States Patent
Kikuchi et al.

(10) Patent No.: US 11,550,205 B2
(45) Date of Patent: Jan. 10, 2023

(54) FLASH UNIT

(71) Applicants: Panasonic Corporation, Osaka (JP); CANON KABUSHIKI KAISHA, Tokyo (JP)

(72) Inventors: Takuma Kikuchi, Osaka (JP); Minenori Kaimoto, Osaka (JP); Yutaka Yamamoto, Tokyo (JP)

(73) Assignees: PANASONIC CORPORATION, Osaka (JP); CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 16/644,406

(22) PCT Filed: Sep. 6, 2018

(86) PCT No.: PCT/JP2018/033094
§ 371 (c)(1),
(2) Date: Mar. 4, 2020

(87) PCT Pub. No.: WO2019/049948
PCT Pub. Date: Mar. 14, 2019

(65) Prior Publication Data
US 2021/0072620 A1    Mar. 11, 2021

(30) Foreign Application Priority Data

Sep. 7, 2017    (JP) .............................. JP2017-171639

(51) Int. Cl.
*G03B 15/05*    (2021.01)
*G01S 17/08*    (2006.01)
(52) U.S. Cl.
CPC .............. *G03B 15/05* (2013.01); *G01S 17/08* (2013.01); *G03B 2215/0521* (2013.01)

(58) Field of Classification Search
CPC ............ G03B 15/05; G03B 2215/0521; G03B 2215/0528; G03B 2215/051; G03B 7/08; G03B 7/16
See application file for complete search history.

(56) References Cited

U.S. PATENT DOCUMENTS 5,392,090 A  *  2/1995  Stephenson, III  .....  G03B 15/05
                                                    396/174
7,801,438 B2 *  9/2010  Khuntia  .................  G03B 17/18
                                                    362/11
(Continued)

FOREIGN PATENT DOCUMENTS

CN      104168817      11/2014
JP      S60-20110      2/1985
(Continued)

OTHER PUBLICATIONS

First Office Action issued for Chinese Patent Application No. 201880057717.6, dated Mar. 11, 2021, 11 pages including machine translation.

(Continued)

*Primary Examiner* — William J Carter
(74) *Attorney, Agent, or Firm* — Hamre, Schumann, Mueller & Larson, P.C.

(57) ABSTRACT

A provided flash unit includes a light emitting part in the main unit of the flash unit and a distance sensor provided only in the light emitting part, achieving an accurate measurement of a distance from a subject. In the flash unit according to the present invention, the light emitting part (10) includes a light receiving element (6) that measures reflected light when light is emitted in advance from the light emitting part (10) to a subject (T) and reflected light when light is emitted in advance from the light emitting part (10) to a reflector (X) for bounce photography, the flash unit determines and controls a proper tilt angle ($\theta 3$) of the light (Continued)

emitting part (10) relative to a main unit (9) based on a distance (La) from the subject (T) and a distance (Lb) from the reflector (X), the distances being measured based on the detection by the light receiving element (6), and directivity for the detection by the light receiving element (6) is tilted toward the main unit (9) with respect to a horizontal direction.

6 Claims, 10 Drawing Sheets

(56) References Cited

U.S. PATENT DOCUMENTS

| | | |
|---|---|---|
| 2015/0015848 A1 | 1/2015 | Haddadi et al. |
| 2015/0261068 A1 | 9/2015 | Ooyama et al. |
| 2016/0072995 A1 | 3/2016 | Kojima et al. |

FOREIGN PATENT DOCUMENTS

| | | |
|---|---|---|
| JP | 2005-189532 | 7/2005 |
| JP | 2005-250204 | 9/2005 |
| JP | 2013-088403 | 5/2013 |
| JP | 2014-038268 | 2/2014 |
| JP | 2016-057498 | 4/2016 |

OTHER PUBLICATIONS

International Search Report of PCT/JP2018/033094, dated Dec. 4, 2018, 4 pages including English translation.

\* cited by examiner

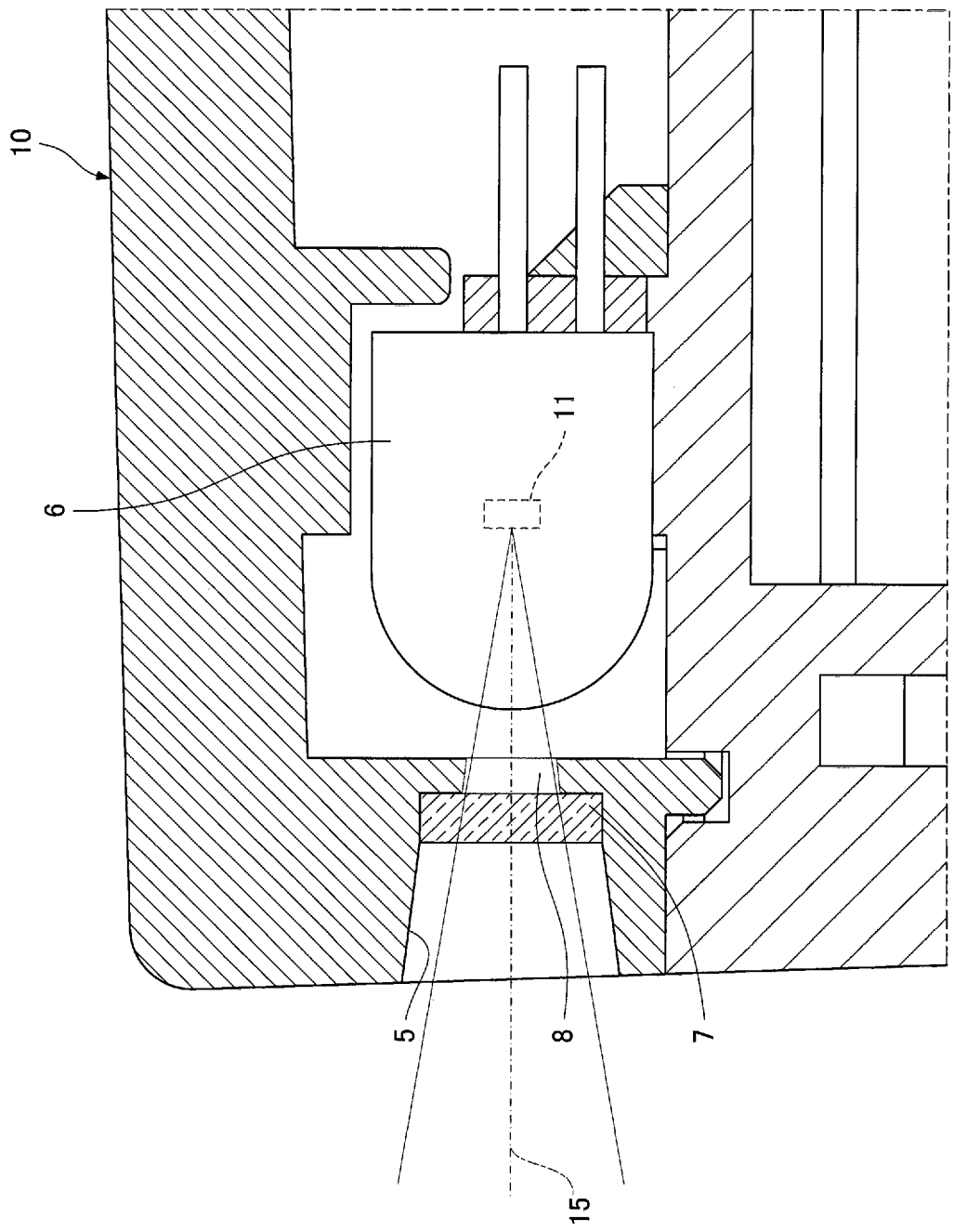

FLASH UNIT

FIELD OF THE INVENTION

The present invention relates to a flash unit that is mounted on a camera and emits light in stroboscopic photography.

BACKGROUND OF THE INVENTION

In stroboscopic photography of a subject with a flash unit mounted on the accessory shoe of a camera, detection light emitted from a front central part 3 of a main unit (the main unit of the flash unit) 9 illustrated in FIG. 7 is reflected by the subject and the reflected light is detected by a distance measuring unit 4 disposed at the front of the main unit 9. Subsequently, a distance between the flash unit 2 and the subject is calculated based on the detection and then lighting is controlled such that a light emitting part 10 connected onto the main unit 9 has a proper amount of light in final shooting.

Alternatively, in this case (in stroboscopic photography of the subject with the flash unit mounted on the accessory shoe of the camera), instead of the detection light emitted from the main unit 9, light emitted in advance from the light emitting part 10 is reflected by the subject and the reflected light is detected by the distance measuring unit 4 disposed at the front of the main unit 9. Subsequently, a distance between the flash unit 2 and the subject is calculated based on the detection and then lighting is controlled such that the light emitting part 10 has a proper amount of light in final shooting.

Stroboscopic photography includes direct photography in which the camera and the light emitting part 10 of the flash unit are opposed to a subject and bounce photography in which the light emitting part 10, which is angled relative to the main unit 9, is not directly oriented to the subject but is directed toward, for example, a ceiling surface serving as a reflector. In this case, in addition to a distance between the camera and the subject, a distance between the flash unit and the ceiling surface is measured while the camera and the flash unit 2 attached to the camera are entirely opposed to the ceiling surface serving as a reflector. Subsequently, based on the distance between the camera and the subject and the distance between the flash unit 2 and the ceiling surface, lighting is controlled such that the light emitting part 10 has a proper angle relative to the main unit 9 and has a proper amount of light in final shooting.

Japanese Patent Laid-Open No. 2014-38268 discloses a technique in which the light emitting part 10 of the flash unit 2 is opposed to a subject T as illustrated in FIG. 8A, a distance La from the subject T is measured by a distance sensor 17 provided on the light emitting part 10, and then the light emitting part 10 is directed toward a ceiling surface X as illustrated in FIG. 8B so as to measure a distance Lb from the ceiling surface X by the distance sensor 17 provided on the light emitting part 10. As illustrated in FIG. 8C, lighting is controlled based on the distance La and the distance Lb in bounce photography such that the light emitting part 10 has a proper angle θ3 relative to the main unit 9 and has a proper amount of light in final shooting.

As disclosed in Japanese Patent Laid-Open No. 2014-38268, a distance is measured by the distance sensor 17 provided on the light emitting part 10, thereby eliminating the need for providing a sensor for measuring a distance on the main unit 9. Furthermore, a distance between the flash unit 2 and the ceiling surface X can be measured without entirely directing the camera 1 and the flash unit 2 attached to the camera 1 toward the ceiling surface X.

In this case, however, when the light emitting part 10 of the flash unit 2 is opposed to the subject T as illustrated in FIG. 8A and a distance from the subject T is measured by the distance sensor 17 provided on the light emitting part 10, the distance La between the camera 1 and the subject T cannot be accurately measured depending upon the position and size of the subject relative to the angle of view of the camera.

An object of the present invention is to provide a flash unit that can accurately measure a distance between a camera and a subject even if a sensor for measuring a distance from the subject is provided only on a light emitting part attached to a main unit.

DISCLOSURE OF THE INVENTION

A flash unit according to the present invention is a flash unit that automatically controls the tilt of a light emitting part relative to a main unit during bounce photography, wherein the light emitting part includes a distance measuring unit that measures reflected light when light is emitted in advance from the light emitting part to a subject and reflected light when light is emitted in advance from the light emitting part to a reflector for bounce photography, the flash unit determines and controls a proper tilt angle of the light emitting part relative to the main unit based on a distance from the subject and a distance from the reflector, the distances being measured based on the detection by the distance measuring unit, and directivity for the detection by the distance measuring unit is tilted toward the main unit with respect to a horizontal direction in a state in which the light emitting part is directed toward the subject.

With this configuration, the directivity for the detection by the distance measuring unit is tilted toward the main unit with respect to the horizontal direction in a state in which the light emitting part is directed toward the subject, thereby increasing the ratio of the area of the subject in the sensor range of the distance measuring unit as compared with horizontal directivity for the detection by the distance measuring unit. In this way, accurate measurement of a distance between the camera and the subject can be achieved.

BRIEF DESCRIPTION OF THE DRAWINGS

FIG. 4 is an enlarged cross-sectional view illustrating the principal part of a light emitting part in a flash unit according to a comparative example in which a distance measuring sensor has horizontal detection directivity;

DESCRIPTION OF THE EMBODIMENT

Referring to FIGS. 1 to 6B, an embodiment of the present invention will be described below.

FIGS. 1 to 3C illustrate Embodiment 1 of the present invention. FIGS. 4 to 6B illustrate a comparative example.

Figure 3A:
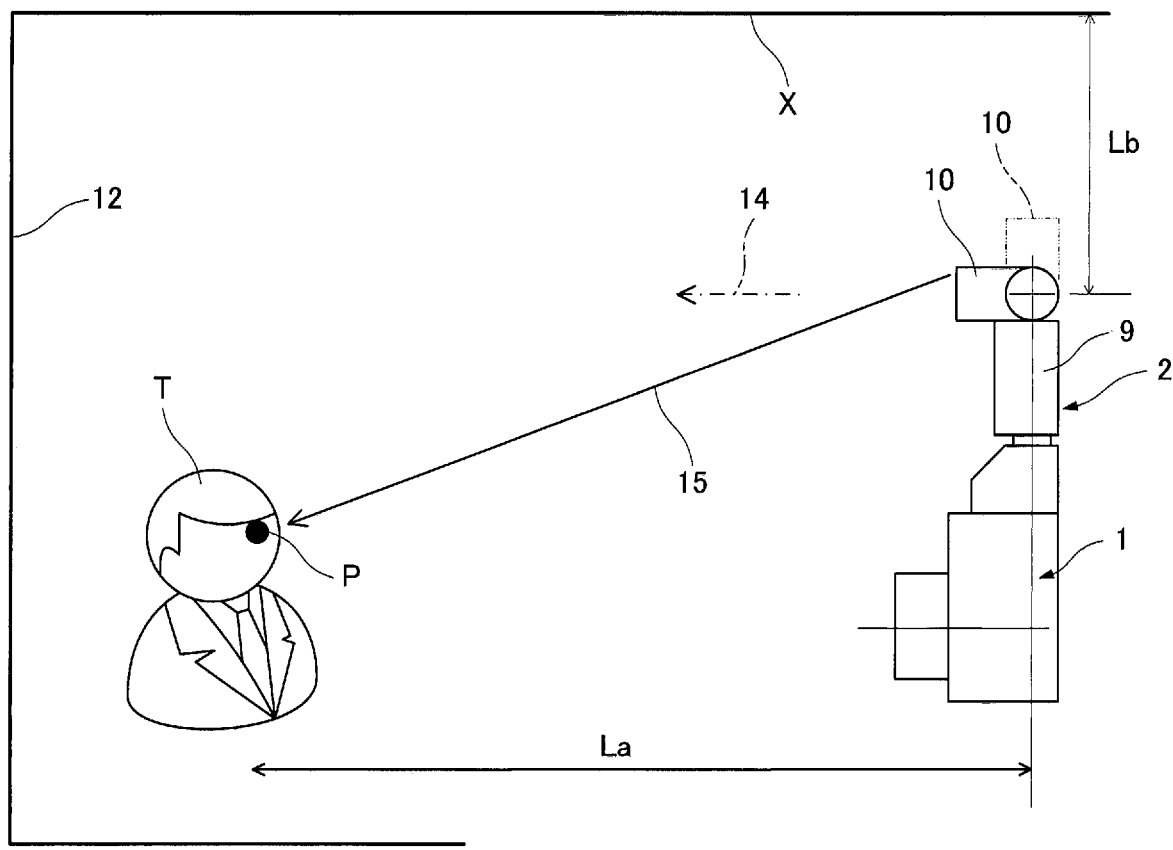
FIG. 3A is an explanatory drawing illustrating a measurement of a distance La from a subject by the flash unit according to the embodiment.

Stroboscopic photography of a subject will be first described below. A flash unit according to the embodiment is mounted on the accessory shoe of a camera that is set in landscape orientation as illustrated in FIG. 3A.

Figure 1:
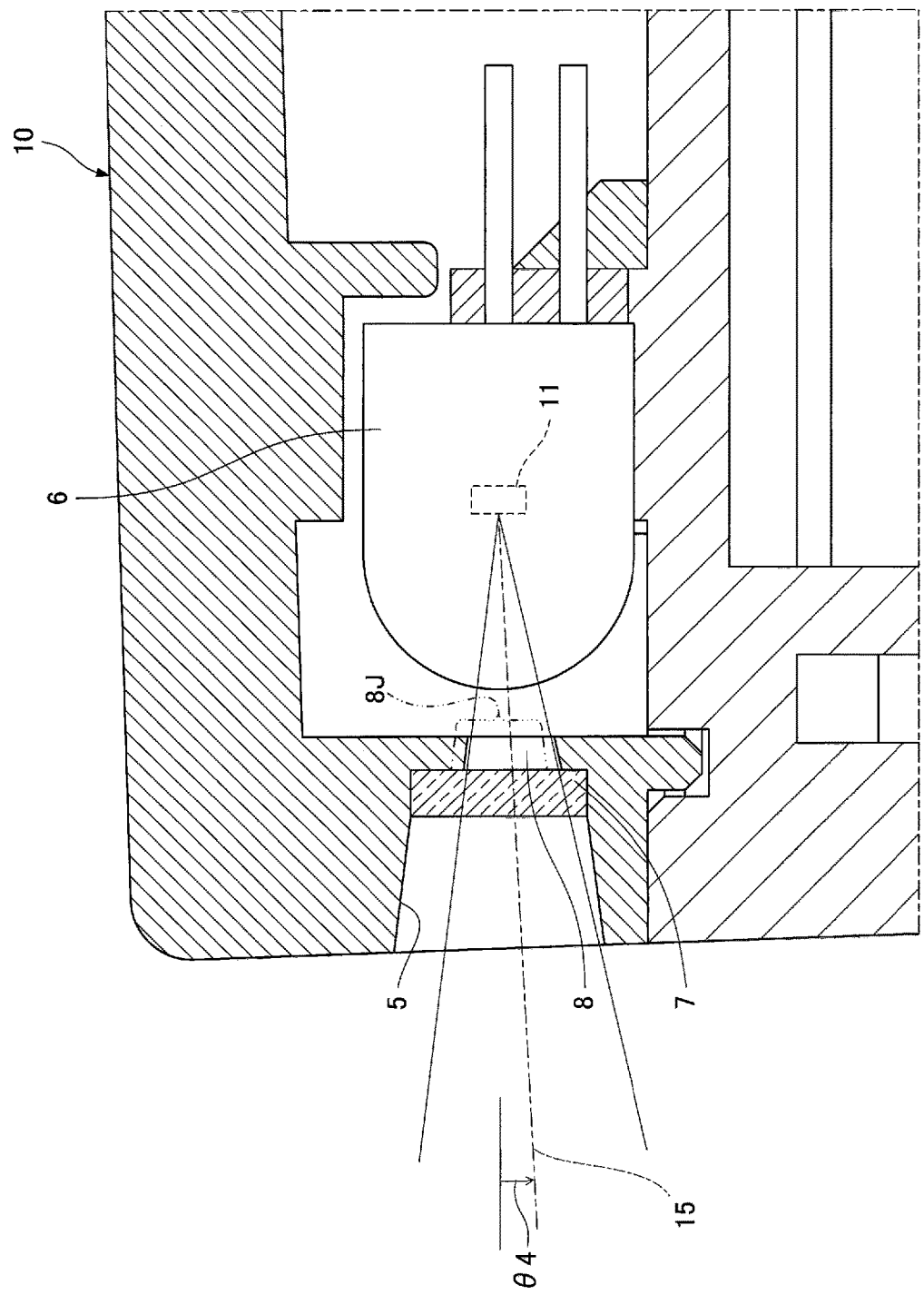
FIG. 1 is an enlarged cross-sectional view illustrating the principal part of a light emitting part in a flash unit according to Embodiment 1 of the present invention.
Figure 2A:
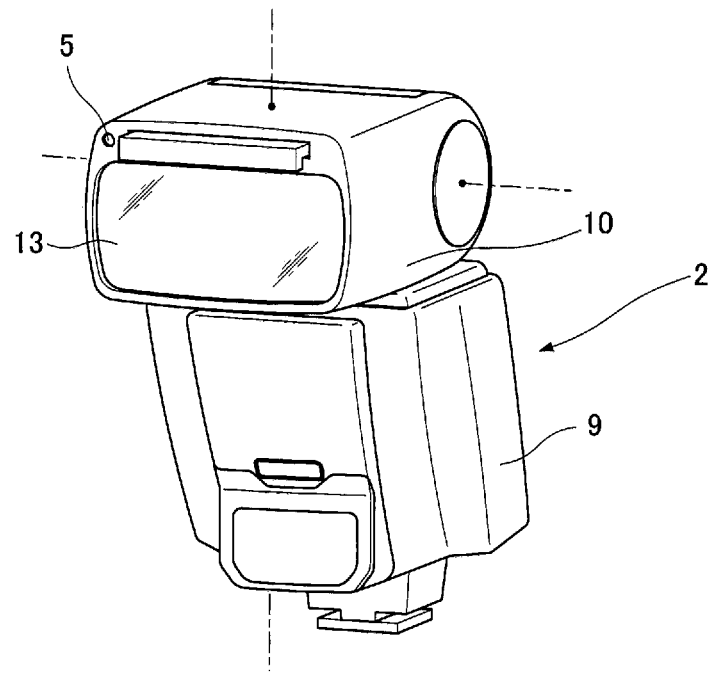
FIG. 2A is an external perspective view illustrating the flash unit according to the embodiment.
Figure 2B:
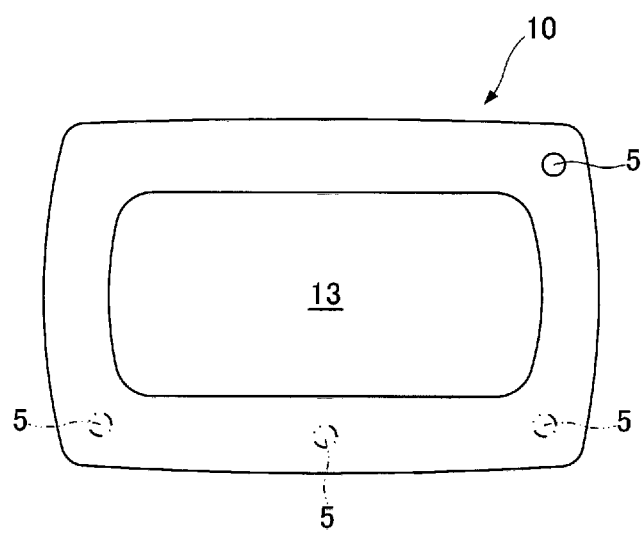
FIG. 2B is a front view of a light emitting part according to another embodiment.

As illustrated in FIG. 2A, a flash unit 2 according to the embodiment includes a light emitting part 10 provided on a main unit (the main unit of the flash unit 2) 9. The light emitting part 10 has a light receiving window 5. As illustrated in FIG. 1, the light emitting part 10 contains a light receiving element 6 constituting a distance measuring unit. Detection light emitted in advance from the light emitting part 10 is reflected by a subject. The reflected light from the subject enters from the light receiving window 5, passes through a protective filter 7 and a diaphragm 8, and enters a light receiving part 11 of the light receiving element 6. In the basic embodiment, the protective filter 7 does not have lens characteristics that allow refraction of passing light.

The light receiving element 6 is disposed with horizontal directivity in the light emitting part 10. However, the position and size of the diaphragm 8 are set relative to the light receiving element 6 such that a direction 15 of the looking angle of the distance measuring unit including the diaphragm 8 and the light receiving element 6 has an angle θ4 in a downward direction from a horizontal position. The downward direction viewed from the light emitting part 10 is a direction that approaches the main unit 9.

In contrast, in a comparative example of FIG. 4, the position and size of the diaphragm 8 are set relative to the light receiving element 6 such that the looking angle of the distance measuring unit including the diaphragm 8 and the light receiving element 6 is located in the horizontal position. Only this point is different from the embodiment.

Figure 5A:
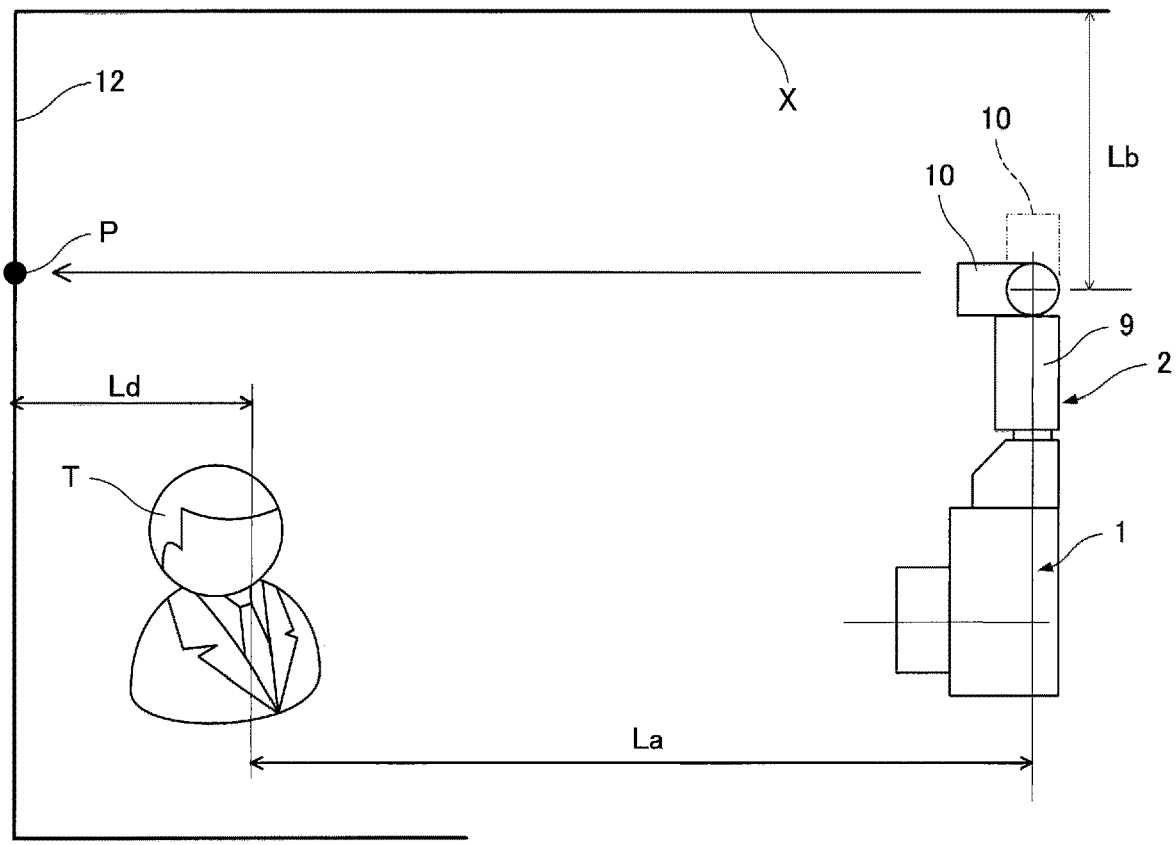
FIG. 5A is an explanatory drawing illustrating a measurement of a distance La from a subject by the flash unit according to the comparative example.
Figure 5B:
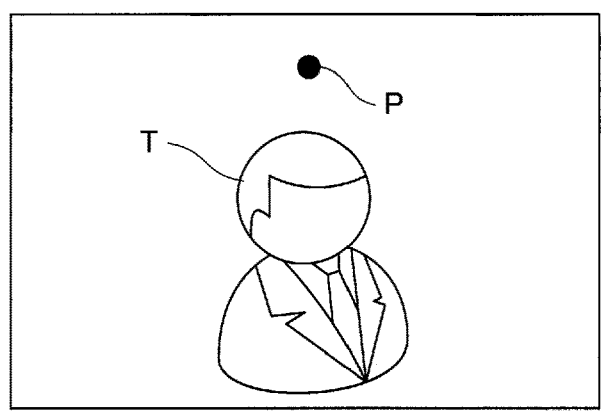
FIG. 5B illustrates the position of emitted detection light in a screen in landscape orientation during a measurement of the distance La from the subject by the flash unit according to the comparative example.

In the comparative example where the distance measuring unit has a looking angle in the horizontal position as illustrated in FIGS. 5A and 5B, the following problems occur: When the camera 1 is set in landscape orientation, the light emitting part 10 is raised 90° as indicated by a virtual line in FIG. 5A and light is emitted in advance from the light emitting part 10 of the flash unit 2 so as to accurately measure a distance Lb from a ceiling surface X serving as a reflector for bounce photography. However, as indicated by a solid line in FIG. 5A, when the light emitting part 10 of the flash unit 2 is opposed to a subject T and emits light in advance to measure a distance from the subject T, the detection light of the light emitted in advance from the light emitting part 10 is more likely to be reflected by a wall surface 12 behind the subject T than by the subject T. P denotes the target position of the flash unit 2. In other words, the subject T has a small area ratio in the sensor range of the light receiving element 6.

In the comparative example, an error Ld is likely to occur in a measurement of a distance from the subject T and thus the flash unit 2 frequently fails to automatically control the angle of the light emitting part 10 to a proper angle during bounce photography.

Figure 6A:
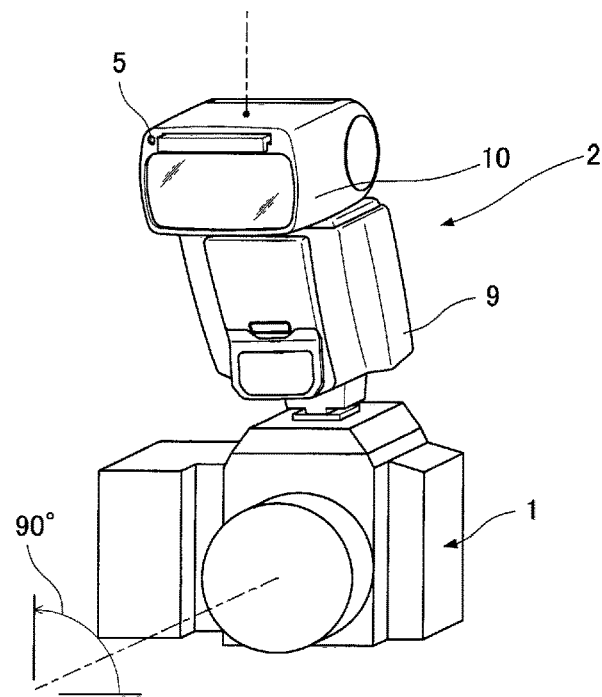
FIG. 6A is an explanatory drawing of photography in portrait orientation.
Figure 6B:
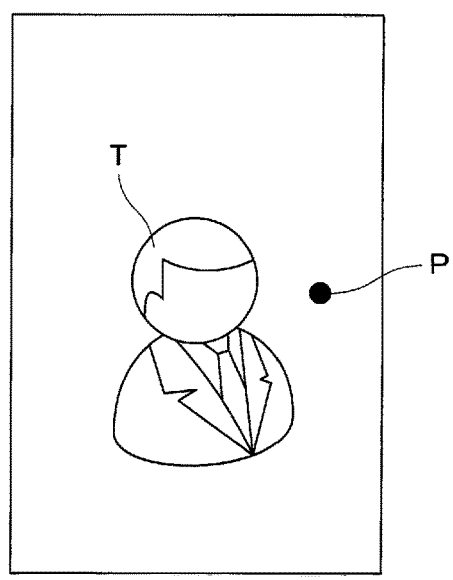
FIG. 6B illustrates the position of emitted detection light in a screen in portrait orientation during photography in portrait orientation.
Figure 7:
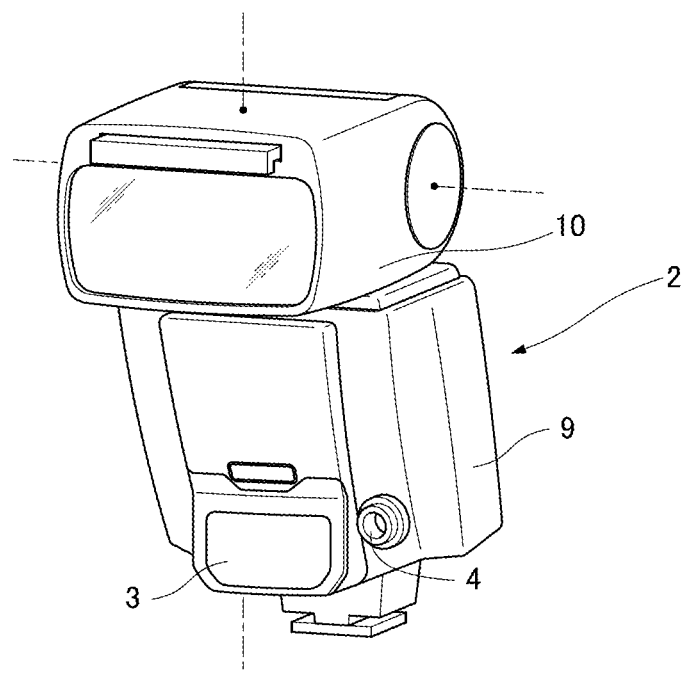
FIG. 7 is an external perspective view illustrating an ordinary flash unit including a light receiving element in the main unit of the flash unit.
Figure 8A:
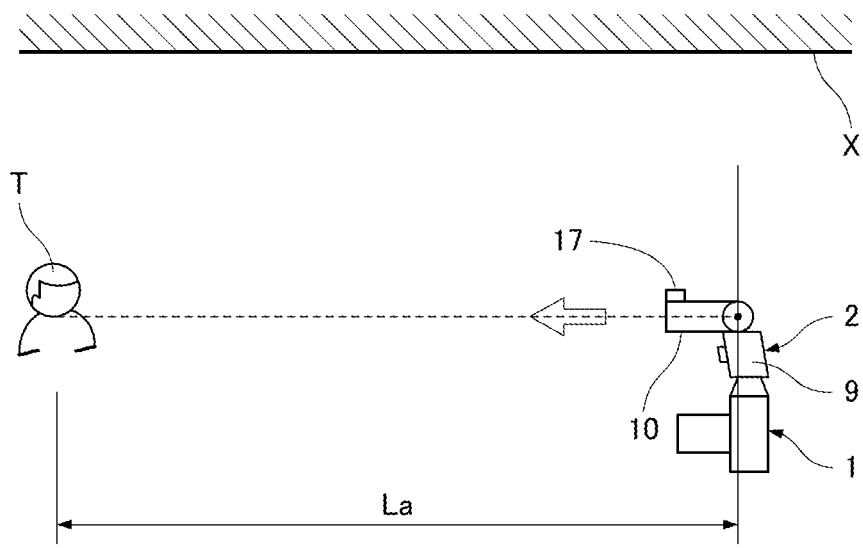
FIG. 8A is an explanatory drawing illustrating a measurement of a distance La from a subject by the ordinary flash unit including a distance sensor in the light emitting part of the flash unit.
Figure 8B:
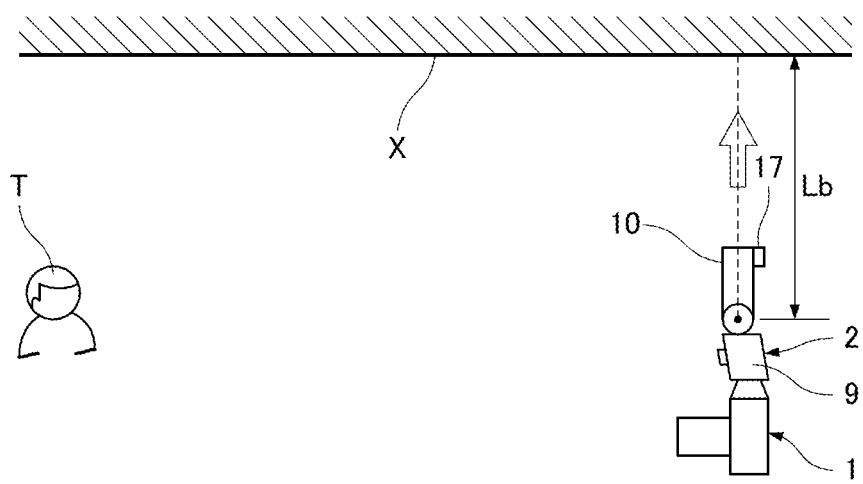
FIG. 8B is an explanatory drawing illustrating a measurement of a distance Lb from a ceiling surface by the ordinary flash unit including the distance sensor in the light emitting part of the flash unit.
Figure 8C:
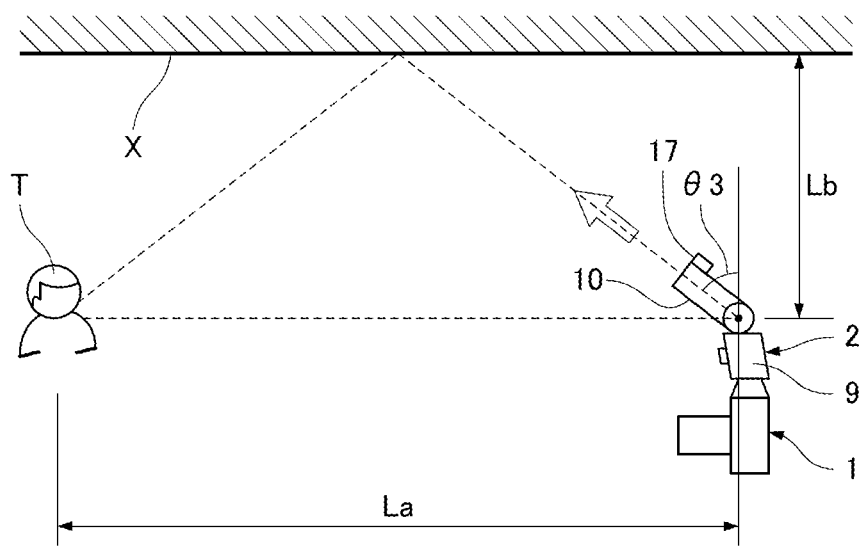
FIG. 8C is an explanatory drawing illustrating bounce photography by the ordinary flash unit including the distance sensor in the light emitting part of the flash unit.

Furthermore, in the comparative example, also when an image of the subject T of FIG. 5A is to be captured by the camera 1 rotated 90° into portrait orientation as illustrated in FIG. 6A, the target position P of the flash unit 2 is frequently displaced from the subject T to the wall surface 12 as illustrated in FIG. 6B. Thus, also when the camera 1 is set in portrait orientation, the flash unit 2 frequently fails to automatically control the angle of the light emitting part 10 to a proper angle during bounce photography.

Figure 3B:
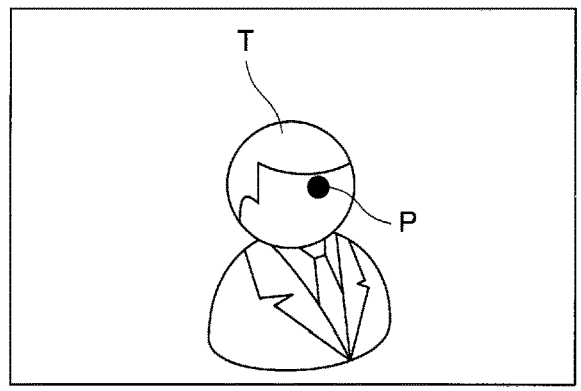
FIG. 3B illustrates the position of emitted detection light in a screen in landscape orientation during a measurement of the distance La from the subject by the flash unit according to the embodiment.
Figure 3C:
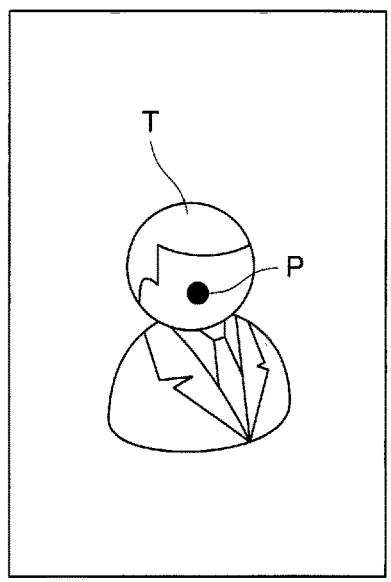
FIG. 3C illustrates the position of emitted detection light in a screen in portrait orientation during a measurement of the distance La from the subject by the flash unit according to the embodiment.

In contrast, the diaphragm 8 in FIG. 1 illustrating the embodiment is located closer to the main unit 9 than the diaphragm 8 (the position of a virtual line 8J) for the light receiving element 6 in FIG. 4, that is, directivity for the detection by the distance measuring unit is tilted toward the main unit 9 with respect to a horizontal direction in a state in which the light emitting part 10 is directed toward the subject T. Thus, both in the landscape orientation and the portrait orientation of the camera 1, the distance Lb can be accurately measured as in the comparative example when a distance from the ceiling surface X is measured. Moreover, when the camera 1 is set in landscape orientation as illustrated in FIGS. 3A and 3B, the target position P of the flash unit 2 is located closer to the main unit 9, that is, lower in a screen in landscape orientation. Hence, the detection light of light emitted in advance from the light emitting part 10 of the flash unit 2 is more likely to be reflected by the subject T than by the wall surface 12 behind the subject T. Consequently, the target position P is more likely to coincide with the subject T than in FIG. 5B, and thereby accurate measurement of the distance La from the subject T can be achieved. In this way, accurate measurement of the distance La from the subject T can be achieved. Also when an image of the subject T of FIG. 5A is to be captured alternatively in portrait orientation, as illustrated in FIG. 3C, the target position P of the flash unit 2 in the embodiment is located closer to the main unit 9, that is, inward in a screen in portrait orientation than in FIG. 6B. Consequently, the target position P is more likely to coincide with the subject T than in FIG. 6B, and thereby accurate measurement of the distance La from the subject T can be achieved.

In the embodiment, both in the landscape orientation and the portrait orientation of the camera 1, the distance La and the distance Lb can be accurately measured with a high frequency. It is thus possible to increase chances of success in automatic control of the angle of the light emitting part 10 to a proper angle both in landscape orientation and portrait orientation during bounce photography compared to the case in the comparative example.

In the embodiment of FIGS. 1 to 3C, the distance measuring unit includes the light receiving element 6 and the diaphragm 8 and the light receiving element 6 is disposed in the light emitting part 10 such that the light receiving element 6 has horizontal directivity. The light receiving element 6 in the light emitting part 10 directed toward the subject T may have downward directivity, that is, the light receiving element 6 may be attached with directivity tilted toward the main unit 9 with respect to the horizontal direction to the light emitting part 10. In this case, the need for the diaphragm 8 in the distance measuring unit can be eliminated.

In the embodiment of FIGS. 1 to 3C, the distance measuring unit includes the light receiving element 6 and the diaphragm 8 and the light receiving element 6 is disposed in the light emitting part 10 such that the light receiving element 6 has horizontal directivity. If the light receiving element 6 and the diaphragm 8 are configured as in the comparative example, the same effects can be obtained as in FIGS. 3A and 3B by regulating the lens characteristics of the protective filter 7 so as to tilt the target position P of the distance measuring unit toward the main unit 9. The insertion position of the protective filter 7 on the optical path of light reflected into the light receiving element 6 can be changed to a position between the diaphragm 8 and the light receiving element 6.

In the foregoing embodiment, the light receiving window 5 is located on the upper right of a light emitting window 13 (see FIG. 2A) of the light emitting part 10. The position of the light receiving window 5 is not limited thereto. The light receiving window 5 may be provided at any location around the light emitting window 13, for example, on the upper left of the light emitting window 13 or any one of positions indicated by virtual lines under the light emitting window 13.

The setting of the looking angle in the horizontal position for the distance measuring unit including the diaphragm 8 and the light receiving element 6 as in the comparative example of FIG. 4 is equivalent to the case where a direction 14 at the center of the flash coverage of the light emitting part 10 and the direction 15 of the looking angle of the distance measuring unit are both horizontal in the shooting pattern of FIG. 3A. From this point of view, the configuration of the foregoing embodiment can be also expressed such that the direction 14 at the center of the flash coverage of the light emitting part 10 and the direction 15 of the looking angle of the distance measuring unit are different from each other.

The present invention can contribute to improvement in the performance of a camera for automated bounce photography.

What is claimed is:

1. A flash unit comprising a main unit and a light emitting part provided on the main unit, the flash unit automatically controlling tilt of the light emitting part relative to the main unit during bounce photography, the flash unit further comprising:
   a distance measuring unit included in the light emitting part and provided at a distance from the main unit, the distance measuring unit measures a first reflected light when a first light is emitted in advance from the light emitting part to a subject and a second reflected light when a second light is emitted in advance from the light emitting part to a reflector for bounce photography,
   wherein the flash unit is configured to determine a first distance to the subject and a second distance to the reflector based on detection by the distance measuring unit,
   wherein the flash unit is configured to determine and control a proper tilt angle of the light emitting part relative to the main unit based on the first distance and second distance, and
   wherein distance detecting directivity of the distance measuring unit is tilted toward the main unit in a state in which the light emitting part is directed toward the subject.

2. The flash unit according to claim 1, wherein the distance measuring unit comprises a light receiving element that detects the first reflected light from the subject.

3. The flash unit according to claim 1, wherein the distance measuring unit comprises:
   a light receiving element that detects the first reflected light from the subject; and
   an aperture that limits a light receiving angle at the light receiving element for the first reflected light incident on the light receiving element.

4. The flash unit according to claim 1, wherein the distance measuring unit comprises:
   a light receiving element that detects the first reflected light from the subject;
   an aperture that limits a light receiving angle at the light receiving element for the first reflected light incident on the light receiving element; and
   a protective filter that has lens characteristics and is inserted on an optical path of the first reflected light into the light receiving element,
   wherein the distance detecting directivity of the distance measuring unit is tilted by the lens characteristics of the protective filter toward the main unit.

5. A flash unit comprising a main unit and a light emitting part provided on the main unit, the flash unit automatically controlling tilt of the light emitting part relative to the main unit during bounce photography, the flash unit further comprising:
   a distance measuring unit included in the light emitting part and provided at a distance from the main unit, the distance measuring unit measures a first reflected light when a first light is emitted in advance from the light emitting part to a subject and a second reflected light when a second light is emitted in advance from the light emitting part to a reflector for bounce photography,
   wherein the flash unit is configured to determine a first distance to the subject and a second distance to the reflector based on detection by the distance measuring unit,
   wherein the flash unit is configured to determine and control a proper tilt angle of the light emitting part relative to the main unit based on the first distance and second distance, and
   wherein a first direction for a center of a flash coverage of the light emitting part and a second direction of a looking angle of the distance measuring unit are different from each other, the looking angle serving as directivity for the detection by the distance measuring unit.

6. The flash unit according to claim 5, wherein the second direction of the looking angle is tilted toward the main unit with respect to the first direction at the center of the flash coverage.

* * * * *